Aug. 28, 1956  G. E. LEADBETTER  2,760,824
SPRINKLER
Filed Nov. 26, 1954

INVENTOR.
GILBERT E. LEADBETTER
BY
Oberlin + Limbach
ATTORNEYS.

United States Patent Office 2,760,824
Patented Aug. 28, 1956

2,760,824

SPRINKLER

Gilbert E. Leadbetter, Mansfield, Ohio

Application November 26, 1954, Serial No. 471,337

2 Claims. (Cl. 299—105)

This invention relates to a sprinkler for use in lawn or garden sprinkling systems and has for a primary object the provision of a device of this nature characterized by improved means for attaching the same to a plastic water supply pipe.

Sprinkler kits comprising components made of plastic material are now available for the assembly and installation of permanent underground sprinkling systems and have met with considerable success because of the ease with which such an installation may be made therefrom by an ordinary purchaser. A typical kit will include a length of flexible plastic pipe, a number of sprinkler risers, a fitting for connecting the pipe to a water tap, and T-fittings for connecting the risers to the pipe.

The system is constructed from these parts by first arranging the pipe on the ground in the particular pattern desired, with one end adjacent the water tap. The locations of the sprinklers along the pipe are determined, and the pipe is then cut at these points. A T-fitting is inserted at each break in the pipe and a riser assembled therewith, the latter being held in an upright position. The system is tested to insure that the desired water coverage is obtained, the sprinklers being moved if necessary, and a V-trench of desired depth is next dug along the pipe line. The pipe and fittings are then placed in the trench and covered with dirt or sod to complete the installation.

The present invention simplifies even further the construction of such a sprinkling system by providing a sprinkler which may quickly and more conveniently be attached to the plastic pipe at any desired point along the length of such pipe.

A further object of the invention is to provide a sprinkler which may be attached to a plastic pipe without the use of a T or other fitting, thereby eliminating the same and also the usual cutting completely through the pipe to accommodate such fittings.

A further object is to provide a sprinkler having an attaching portion adapted to penetrate the wall of a pipe made of plastic material and provide communication for the flow of water from the pipe to the sprinkler.

Other objects and advantages will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
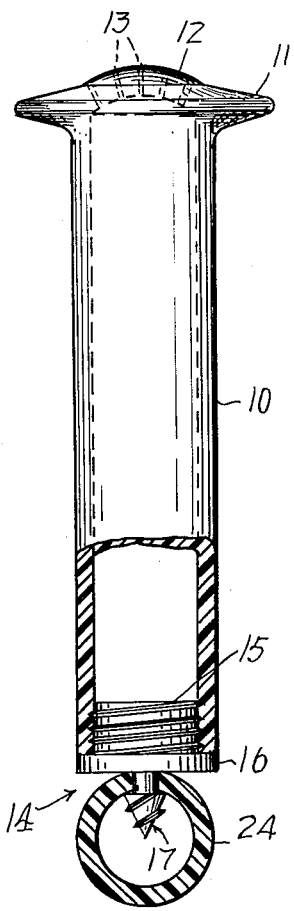
Fig. 1 is an elevational view of my new sprinkler, showing the same attached to a plastic pipe or hose.
Figure 2:
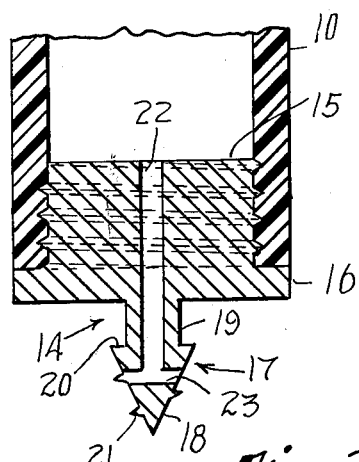
Fig. 2 is a fragmentary longitudinal section of the lower end of the sprinkler, the plane of the section being indicated by the line 2—2 in Fig. 3.
Figure 3:
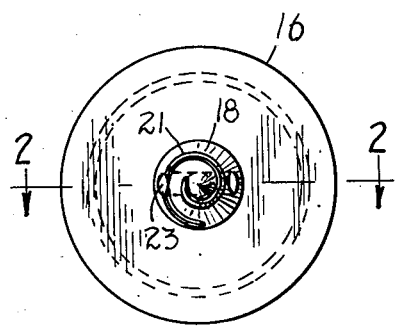
Fig. 3 is an end view of such lower portion of the sprinkler.

Referring now to the drawings in detail, the sprinkler proper is of the construction described in detail in my copending application Serial No. 451,826, filed August 24, 1954, which comprises a tubular extension 10, an outwardly flared apron 11 at the upper end thereof, and a rounded spray head 12 closing such end. The head is provided with a number of substantially radial orifices 13 arranged to produce the desired spray pattern of water forced therethrough.

In accordance with the present invention, this sprinkler body is provided with a closure, indicated generally at 14, at its lower end, such closure being preferably made of brass. The closure is formed to comprise an externally threaded end portion 15, which is threaded into the lower end of the tubular extension 10, a plate 16 of a diameter approximately the same as the outer diameter of the extension, and a threaded and pointed spud, designated generally by references numeral 17. As illustrated, the closure is threaded into the extension tightly to abut plate 16 against the end wall thereof, the spud 17 projecting downwardly from the central portion of the exposed face of the plate.

Spud 17 comprises an outer conical portion 18 and a connecting neck 19 which spaces the conical portion a predetermined distance below the plate 16. Neck 19 has a smaller diameter than the base of the cone, so that an annular shoulder 20 is provided at such spaced distance from plate 16.

The outer conical portion 18 has an external thread 21, whereby the spud may be advanced into the wall of a plastic pipe to pierce the same. A passage 22 extends axially through the closure from its inner end to a point within the portion 18 and there communicates with a transverse inlet passage 23.

The sprinkler is attached to a pipe 24 made of plastic material, preferably polyethylene, by first making a small starting hole in the pipe wall and then threading the spud therethrough. The spacing of spud shoulder 20 from plate 16 is determined by the wall thickness of the pipe such that the spud just passes completely through the wall, as shown in Fig. 1. Due to the resiliency of the plastic, the pipe wall closes about the reduced neck 19 of the spud after being distorted by entry of portion 18, whereby the neck is snugly gripped in the wall. Shoulder 20 and plate 16 cooperably grip this penetrated section of the wall therebetween.

Such attachment may be made before or after burying the pipe in the ground, generally to a depth to locate the spray head of the sprinkler riser flush with the ground level. Passages 22 and 23 of the sprinkler closure provide communication between the sprinkler and pipe, so that water under pressure in the latter will enter the sprinkler body and be discharged therefrom through the spray head. It will be noted that end portion 15 and conical portion 18 of the spud are threaded in the same direction, drag on the closure in the act of piercing the pipe thereby tightening the engagement with the tubular extension of the sprinkler.

As indicated in my aforesaid copending application, the sprinkler body is desirably made of molded polyethylene or another thermoplastic material, for example, butyrate, polyvinyl chloride or polystyrene, so that its normal spray pattern can very easily be modified by melting shut selected discharge orifices. It will, however, be appreciated that the advantages of the new construction herein disclosed do not depend upon any particular material or class of materials being used, although it is preferred to provide the same ease of spray modification. The new sprinkler could, for example, also be made of metal.

Similarly, the sprinkler has been described in connection with a polyethylene pipe since this is the type of plastic pipe usually preferred in such sprinkling systems. The sprinkler is, of course, adapted for attachment in the manner set forth to any pipe thus penetrable by the pointed and threaded sprinkler end and having resiliency such to grasp and seal the neck of the spud. Pipes made of rubber and of butyrate are further examples.

It will accordingly be seen that my new sprinkler may be attached to such a pipe completely without clamps or fittings and at any desired location along the pipe. Separation of the pipe is unnecessary, and a single simple attachment replaces the distinct multiple attachments required to be made with a conventional T-fitting.

Other modes of applying the principle of the invention may be employed, change being made as regards the details described, provided the features stated in any of the following claims, or the equivalent of such, be employed.

I therefore particularly point out and distinctly claim as my invention:

1. A sprinkler adapted for attachment to a supply pipe made of resiliently deformable material, comprising an elongated tubular body closed at one end by a spray head in which a plurality of discharge orifices are formed, a separately constructed plug closing the other end of said body, such plug having a cylindrical connecting portion threadably engaged with the tubular body at such other end, an integral extension projecting axially outwardly from such connecting portion, said extension having a smooth cylindrical outer surface of a diameter which is considerably smaller than the diameter of the connecting portion, a pipe-piercing portion at the end of the extension in the form of an outwardly directed conical bit having external threads, the base of said bit being larger than the axial extension and defining an abrupt shoulder therewith, such extension being of such length that the spacing of the shoulder from the connecting portion is approximately equal to the wall thickness of the supply pipe, the sprinkler being attached to the pipe by forcing the bit completely through the wall thereof, whereby the pipe material at the point of attachment is engaged about the smooth axial extension of the plug and is gripped between the shoulder and connecting portion, and a passageway extending through the plug from the bit thereof to provide communication between the supply pipe and the sprinkler body when the two are thus connected.

2. A sprinkler as set forth in claim 1 characterized further in that said passageway comprises an inlet portion in said bit which extends transversely of the same.

References Cited in the file of this patent

UNITED STATES PATENTS

| | | |
|---|---|---|
| 1,328,104 | Servis | Jan. 13, 1920 |
| 1,520,048 | Baird | Dec. 23, 1924 |
| 1,962,534 | Sweetland | June 12, 1934 |
| 1,991,851 | Hammell | Feb. 19, 1935 |
| 2,563,300 | Aker | Aug. 7, 1951 |